S. Purdy,
Cheese Hoop.

No. 76,315.    Patented Apr. 7, 1868.

Witnesses:
H. Seymour Jr.
John Crocker

Inventor:
Stephen Purdy

United States Patent Office.

STEPHEN PURDY, OF WHITESTOWN, NEW YORK, ASSIGNOR TO HIMSELF AND ELLIS ELLIS, OF SAME PLACE.

*Letters Patent No. 76,345, dated April 7, 1868.*

IMPROVEMENT IN CHEESE-HOOPS.

*The Schedule referred to in these Letters Patent and making part of the same.*

TO ALL WHOM IT MAY CONCERN:

Be it known that I, STEPHEN PURDY, of Whitestown, Oneida county, New York, have invented a new and useful Improvement in Cheese-Hoops.

The nature of my invention consists in the construction and arrangement of the parts, so that the hoop may be opened at its side, by means of which the cheese when pressed may be readily removed from the hoop without labor, while lateral pressure upon the cheese may be obtained.

And I do hereby declare that the following is a full, clear, and exact description of my said invention, and of the mode of operation of the same, reference being had to the annexed drawings, making a part of this specification, in which—

Figure 1:
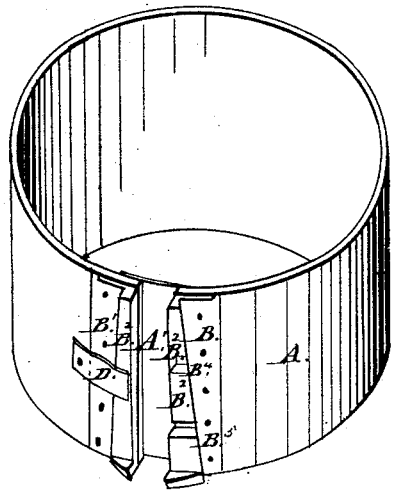

Figure 1 represents the hoop in perspective.

Figure 2:
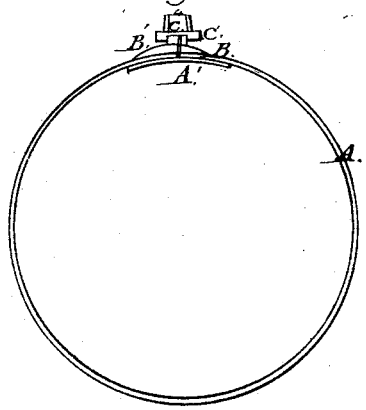

Figure 2, a plan of the hoop; and

Figure 3:
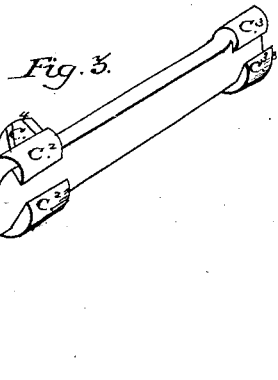

Figure 3, a perspective view of the clamps.

A is the hoop; A', a plate covering the side opening in the hoop; B and $B^1$, flanges attached to the sides of the openings, having $B^2$ and $B^3$, tapering lips or grooved edges; $B^4$ and $B^5$, cross-openings in $B^3$; C, a bar, having the clamps $C^1$, $C^2$, and $C^3$, attached to it; $C^4$ is a knob or arm for pressing down or raising the clamps; D is a spring or catch to hold C in place when detached from $B^3$. The hoop A may be of wood or metal, of the usual form, or of almost any other form. Instead of making its sides continuous, I cut it down the side, as seen in fig. 1, and attach to each side a flange, B and $B^1$. The edges or lips $B^2$ and $B^3$ are tapering upwards, with a slight groove on their outer sides. The lip $B^3$ is cut through down to the flange B, as seen at $B^4$ $B^5$. A plate of thin metal, A', is attached to the inside of the hoop on one side of the slit, and overlapping the other side, so that the hoop may be opened to any desired distance, and yet the space be closed by such plate, while being attached only to one side, it permits the edges of the hoop to be brought together, as seen in fig. 2. The bar C has clamps at each end and at the centre, $C^1$ $C^2$ $C^3$, as seen in fig. 3. These clamps are so formed as exactly fit on to the lips or edges $B^2$ and $B^3$ of the flanges, when the hoop is brought together, and thus hold the hoop firmly together, the clamps and lips forming dove-tails. As the taper of the lips is considerable, the lower clamps $C^1$ and $C^2$ may be slipped upward, and allow the hoop to open considerably without entirely removing them.

The operation and value of the invention will be apparent from the description given. When a cheese is to be formed and pressed, the edges of the hoop are brought together and the clamps are pressed down over the edges $B^2$ and $B^3$, and when the curd has been sufficiently pressed, by raising the clamps the hoop springs open, and the cheese is removed without the labor now necessary to do it, and without injury to the cheese. The clamps may not be pressed fully down at first until the end pressure has been applied, when the clamps may be driven down, and thus lateral pressure be obtained and the cheese more firmly pressed. And to increase the capacity in this respect, the hoop may be divided in more than one place. The cross-openings $B^4$ and $B^5$ permit the clamps $C^1$ and $C^2$ to pass through when raised to these points, and thus allow the hoop to be opened and closed without taking the bar C off from the hoop, while the spring D holds the bar C to the lip $B^2$.

It is known that a great deal of time is lost in removing the cheese from the hoop. All this is obviated by my invention, while a considerable lateral pressure is obtained, which aids in expressing the whey and rendering the cheese firmer.

Instead of uniting the clamps to the bar C, they may of course be all separate, and so, instead of separate clamps, there may be but one long one; but the form I have given will, I think, be found the best.

Having thus described my invention, what I claim therein as new, and desire to secure by Letters Patent, is—

1. Constructing cheese-hoops with a side opening, or openings, with a flange on each side, and a clamp or clamps to hold them together, in the manner substantially as described, and for the uses and purposes mentioned.

2. The said hoop with openings, flanges, and clamps, in combination with the plate A', constructed and operating as described, and for the uses and purposes mentioned.

3. The said hoop with the openings, flanges, and clamps, in combination with the spring or catch D, and the cross-openings $B^4$ and $B^5$, constructed and operating substantially as described, and for the uses and purposes mentioned.

STEPHEN PURDY.

Witnesses:
H. SEYMOUR, Jr.,
JOHN G. CROCKER.